United States Patent
Yukimura et al.

(10) Patent No.: US 9,546,232 B2
(45) Date of Patent: Jan. 17, 2017

(54) RUBBER COMPOSITION, AND PNEUMATIC TIRE USING SAME

(71) Applicants: BRIDGESTONE CORPORATION, Tokyo (JP); OTSUKA CHEMICAL CO., LTD., Osaka-shi, Osaka (JP)

(72) Inventors: Noriaki Yukimura, Kodaira (JP); Takahiro Yoshizawa, Kodaira (JP); Kazuhiro Kodama, Tokushima (JP); Hiroaki Yuasa, Itano-gun (JP); Noriaki Shiina, Tokushima (JP); Takashi Sato, Tokushima (JP); Hiroyuki Ishitobi, Awa (JP); Mifuyu Ueno, Itano-gun (JP); Shinya Nakashima, Itano-gun (JP); Masaki Abe, Itano-gun (JP)

(73) Assignees: BRIDGESTONE CORPORATION, Tokyo (JP); OTSUKA CHEMICAL CO., LTD., Osaka-shi ( * ) Notice: Subject to any disclaimer, the term of this patent is extended or adjusted under 35 U.S.C. 154(b) by 0 days.

(21) Appl. No.: 14/764,000

(22) PCT Filed: Jan. 30, 2014

(86) PCT No.: PCT/JP2014/052168
§ 371 (c)(1),
(2) Date: Jul. 28, 2015

(87) PCT Pub. No.: WO2014/119691
PCT Pub. Date: Aug. 7, 2014

(65) Prior Publication Data
US 2015/0353657 A1 Dec. 10, 2015

(30) Foreign Application Priority Data
Jan. 30, 2013 (JP) .................. 2013-016263

(51) Int. Cl.
| | | |
|---|---|---|
| C08F 136/00 | (2006.01) | |
| C08F 136/08 | (2006.01) | |
| C08L 7/00 | (2006.01) | |
| C08L 9/00 | (2006.01) | |
| B60C 1/00 | (2006.01) | |
| C08K 5/3447 | (2006.01) | |
| C08K 5/29 | (2006.01) | |
| C08K 5/372 | (2006.01) | |

(52) U.S. Cl.
CPC .............. *C08F 136/08* (2013.01); *B60C 1/00* (2013.01); *C08K 5/29* (2013.01); *C08K 5/3447* (2013.01); *C08K 5/3725* (2013.01); *C08L 7/00* (2013.01); *C08L 9/00* (2013.01)

(58) Field of Classification Search
CPC .............. B60C 1/00; C08L 9/00; C08L 7/00; C08L 21/00; C08K 5/3447; C08K 5/3725; C08K 5/29; C08F 136/08
See application file for complete search history.

(56) References Cited

U.S. PATENT DOCUMENTS

| | | | |
|---|---|---|---|
| 5,889,123 A | 3/1999 | Schubart et al. | |
| 2005/0187340 A1 | 8/2005 | Blanchard et al. | |
| 2010/0256294 A1* | 10/2010 | Ikeda et al. ............. | C08K 5/18 524/559 |

FOREIGN PATENT DOCUMENTS

| | | | |
|---|---|---|---|
| JP | 62-184036 A | 8/1987 | |
| JP | 09-278942 A | 10/1997 | |
| JP | 10-120852 A | 5/1998 | |
| JP | 10-330549 A | 12/1998 | |
| JP | 2000-239446 A | 9/2000 | |
| JP | 2004-026924 A | 1/2004 | |
| JP | 2005-529221 A | 9/2005 | |
| JP | 2007-161792 A | 6/2007 | |
| JP | 2008056939 A | 3/2008 | |
| JP | 2008-156447 A | 7/2008 | |
| JP | 2011-089031 A | 5/2011 | |
| JP | 2012-082377 A | 4/2012 | |
| JP | 2012-153865 A | 8/2012 | |
| JP | 2012-219150 A | 11/2012 | |
| WO | 2009/096518 A1 | 8/2009 | |
| WO | 2012/031183 A2 | 3/2012 | |

OTHER PUBLICATIONS

International Search Report of PCT/JP2014/052168 dated Apr. 22, 2014 [PCT/ISA/210].
Communication dated Jul. 28, 2016, issued by the European Patent Office in corresponding European Application No. 14746370.7.
Nidhi Tyagi et al., "Copper(II) complexes of a new tetradentate bisbenzimidazolyl diamide ligand with disulfanediyl linker: synthesis, characterization, and oxidation of some pyridyl, napthyl, and benzyl alcohols", Journal of Coordination Chemistry, Jul. 31, 2013, vol. 66, No. 19, pp. 3335-3348.

\* cited by examiner

*Primary Examiner* — Nathan M Nutter
(74) *Attorney, Agent, or Firm* — Sughrue Mion, PLLC

(57) ABSTRACT

The invention provides a rubber composition prepared by mixing, per 100 parts by mass of the rubber component comprising at least 50% by mass of a diene-based rubber, from 20 to 150 parts by mass of a filler, and from 0.05 to 30 parts by mass of a compound A which has a specific amidine structure and has a functional group reactive with the diene-based rubber. The rubber composition improves both a high elastic modulus and a low tan δ. The invention also provides a pneumatic tire using the rubber composition.

7 Claims, No Drawings

RUBBER COMPOSITION, AND PNEUMATIC TIRE USING SAME

CROSS REFERENCE TO RELATED APPLICATIONS

This application is a National Stage of International Application No. PCT/JP2014/052168, filed Jan. 30, 2014, claiming priority based on Japanese Patent Application No. 2013-016263, filed Jan. 30, 2013, the contents of all of which are incorporated herein by reference in their entirety.

TECHNICAL FIELD

The present invention relates to a rubber composition satisfying both a high elastic modulus and a low-heat-generation property, and relates to a pneumatic tire obtained using the rubber composition.

BACKGROUND ART

While running, heavy-load pneumatic tires for trucks, busses and the like, or off-road tires, especially the rubber composition arranged in the tread part thereof are repeatedly given a great strain amplitude, and the tire temperature is thereby turned up. Consequently, for prolonging the life of tires, the tire temperature increase must be prevented. For preventing the tire temperature increase, it is desirable that the tire tread rubber is prevented from being deformed by increasing the elastic modulus thereof in a high-temperature range, and/or the low-heat-generation property of the tire tread rubber composition is improved, or that is, tan δ thereof is lowered.

In already-existing pneumatic tires, the amount of the filler such as carbon black or the like in a rubber composition is increased or an additive such as a resin or the like is added to the composition for improving the elastic modulus of the composition. In this case, however, there occur problems in that the viscosity of the unvulcanized rubber composition increases owing to the increase in the amount of the filler so that the workability during kneading of the composition worsens, or tan δ of the vulcanized rubber composition increases.

On the other hand, for lowering tan δ, the type and the amount of the carbon black to be in the rubber composition are changed, for example, the particle size of the carbon black is increased or the amount of the carbon black is decreased. However, these methods lower the abrasion resistance of the tread rubber and lower the fracture resistance such as cutting resistance and chipping resistance thereof, and after all, it is difficult to improve the low-heat-generation property of the rubber composition by changing the type and the amount of carbon black to be in the composition. In addition, it is known that, when carbon black is substituted with silica and is used along with a silane coupling agent, then tan δ can be reduced; however, the abrasion resistance and the fracture resistance of the rubber composition are lowered and the durability of tires is thereby worsened.

As opposed to this, in PTL 1, it has been found that addition of a hydrazide compound can improve the low-heat-generation property with neither increasing the Mooney viscosity of the resultant composition nor lowering the abrasion resistance and the fracture resistance thereof.

However, it is desired to provide a rubber composition satisfying a high elastic modulus and a low tan δ both on a further higher level.

CITATION LIST

Patent Literature

PTL 1; JP-A 10-330549

SUMMARY OF INVENTION

Technical Problem

Given the situation, an object of the present invention is to provide a rubber composition capable of satisfying both a high elastic modulus and a low tan δ and to provide a pneumatic tire using the rubber composition.

Solution to Problem

For solving the above-mentioned problems, the present inventors investigated in detail molecular structures having high reactivity with polymer and molecular structures having high chemical interactivity with filler such as carbon black or the like. With that and as a result of investigations of various compounds, the present inventors have found that, as a molecular structure having reactivity heretofore not known in the art, incorporation of a compound having an amidine structure and having a functional group reactive with a diene-based rubber can solve the above-mentioned problems, and have completed the present invention.

Specifically, the present invention provides a rubber composition prepared by mixing, per 100 parts by mass of a rubber component comprising at least 50% by mass of a diene-based rubber, from 20 to 150 parts by mass of a filler, and from 0.05 to 30 parts by mass of a compound A which has an amidine structure represented by the following formula (I) and has a functional group reactive with the diene-based rubber, and provides a pneumatic tire using the rubber composition.

(I)

Advantageous Effects of Invention

According to the present invention, the addition of the compound A having an amidine structure represented by the above-mentioned formula (I) and having a functional group reactive with a diene-based rubber (hereinafter this may be abbreviated as "compound A") improves the chemical interaction between the filler and the rubber component and exhibits the following effects.

(1) The reinforcing performance of the filler is improved. In particular, the reinforcing performance of carbon black is improved. With that, the hysteresis loss owing to the filler particles in friction is reduced and, as a result, the composition secures both a high elastic modulus and a low tan δ. Further, the reinforcing performance of an inorganic filler, especially silica for the rubber component is also improved, and therefore even the rubber composition containing both carbon black and an inorganic filler such as silica or the like as the filler component can still secure both a high elastic modulus and a low tan δ.

(2) Along with the above-mentioned effect (1), the amidine structure not containing a nitrogen-hydrogen bond (N—H bond) inhibits gelation of the rubber component. In particular, the amidine structure in which the nitrogen atom bonds to the functional group reactive with a diene-based rubber via an alkyl chain and which does not contain a nitrogen-hydrogen bond (N—H bond) can further prevent gelation of the rubber component. Accordingly, while still maintaining the high elastic modulus and the low tan δ thereof, the viscosity of the unvulcanized rubber composition can be prevented from increasing, and the workability of the unvulcanized rubber composition can be prevented from being worsened.

(3) Further, along with the above-mentioned effect (1), in particular, the amidine structure that contains an amide structure (where a carbonyl group directly bonds to the nitrogen atom in the amidine structure) improves the scorching resistance of the rubber composition (that is, prolongs the scorch time for the composition) while maintaining the high elastic modulus and the low tan δ.

(4) The reinforcing performance of the inorganic filler, especially silica can be improved, and therefore the amount of the silane coupling agent to be incorporated may be reduced and, as a result, the unreacted silane coupling agent in the unvulcanized rubber composition can be thereby reduced and the rubber scorching during the unvulcanized rubber composition working step can be prevented.

DESCRIPTION OF EMBODIMENTS

The present invention is described in detail hereinunder.

The rubber composition of the present invention is prepared by mixing, per 100 parts by mass of the rubber component comprising at least 50% by mass of a diene-based rubber, from 20 to 150 parts by mass of a filler, and from 0.05 to 30 parts by mass of a compound A which has an amidine structure represented by the following formula (I) and has a functional group reactive with the diene-based rubber.

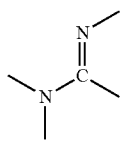

(I)

The amidine structure represented by the above-mentioned formula (I) effectively reacts with the filler and, as cooperating with the functional group reactive with the diene-based rubber, enhances the chemical interaction between the filler and the rubber component while assisting the rubber composition to have a high elastic modulus and a low tan δ.

Compound A

The compound A in the present invention has an amidine structure represented by the above-mentioned formula (I) and has a functional group reactive with a diene-based rubber.

The amidine structure preferably forms a hetero ring represented by the following formula (II-1) or (II-2).

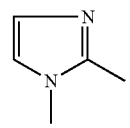

(II-1)

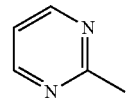

(II-2)

In the case where the amidine structure forms the hetero ring represented by the above-mentioned formula (II-1) or (II-2), since the amidine structure has an aromatic property, the affinity of the amidine structure with a carbon black skeleton is increased, and therefore the chemical interaction between the compound A and carbon black is thereby further increased. Accordingly, both the high elastic modulus and the low tan δ of the rubber composition can be improved on a higher level. From the viewpoint of the aromatic property thereof, an aromatic ring may be condensed with the amidine structure of the above-mentioned formula (II-1) or (II-2) to form a multicyclic structure. As the aromatic ring, 4- to 7-membered rings are exemplified, and preferred are a 5-membered ring and a 6-membered ring.

The amidine structure in the present invention may have at least one nitrogen-hydrogen bond (N—H), but preferably, the structure does not have a nitrogen-hydrogen bond (N—H). Further preferably, the amidine structure forms a hetero ring represented by the above-mentioned formula (II-1), in which the nitrogen atom of the amidine structure bonds to the functional group reactive with a diene-based rubber via an alkyl chain and which does not have a nitrogen-hydrogen bond (N—H) (structure represented by the following formula (II-3)).

In the case where the amidine structure of the present invention does not has a nitrogen-hydrogen bond (N—H) and the nitrogen atom of the amidine structure bonds to the functional group reactive with a diene-based rubber via an alkyl chain existing therebetween, gelation of the diene-based rubber can be more effectively prevented and the viscosity of the unvulcanized rubber composition can be thereby prevented from increasing.

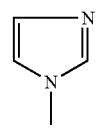

(II-3)

In the above-mentioned formulae (II-2) and (II-3), the hetero ring may bond to an aromatic ring or may not bond to an aromatic bond.

Further, the amidine structure in the present invention preferably has an amide structure represented by the following formula (III) in which a carbonyl group directly bonds to the nitrogen atom in the amidine structure. Having the structure, the compound may prolong the scorch time for the unvulcanized rubber composition, and the unvulcanized rubber composition therefore exhibits better workability.

(III)

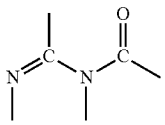

From the viewpoint of improving the workability of the unvulcanized rubber composition, the amidine structure in the compound A in the present invention is preferably a structure selected from the amidine structure represented by the above-mentioned formula (II-3) and an amide structure represented by the above-mentioned formula (III).

The compound A in the present invention has, along with the above-mentioned amidine structure, a functional group reactive with a diene-based rubber. The functional group reactive with a diene-based rubber is preferably at least one selected from a polysulfide group, a thiol group (also referred to as a mercapto group), a hydrazide group and a hydrazone group, from the viewpoint of the efficient reactivity thereof with a diene-based rubber to form a tougher reinforcing layer of the rubber composition.

The compound A in the present invention is preferably at least one compound selected from bis[(1H-benzimidazol-1-yl)methyl] disulfane, bis[2-(1H-benzimidazol-1-yl)ethyl] disulfane, bis[2-(1H-benzimidazol-1-yl)propyl disulfane, bis[2-(1H-benzimidazol-1-yl)butyl] disulfane, bis[2-(1H-benzimidazol-1-yl)pentyl] disulfane, bis[(1H-imidazol-1-yl)methyl] disulfane, bis[2-(1H-imidazol-1-yl)ethyl] disulfane, bis[2-(1H-imidazol-1-yl)propyl] disulfane, bis[2-(1H-imidazol-1-yl)butyl] disulfane, bis[2-(1H-imidazol-1-yl)pentyl] disulfane, bis[2-(1H-benzimidazol-1-yl)-2-oxoethyl] disulfane, bis[3-(1H-benzimidazol-1-yl)-3-oxopropyl] disulfane, bis[3-(1H-benzimidazol-1-yl)-3-oxobutyl] disulfane, bis[3-(1H-benzimidazol-1-yl)-3-oxopentyl] disulfane, 2-(1H-benzimidazol-1-yl)acetohydrazide, bis[(1H-benzimidazol-2-yl)methyl] disulfane, bis[2-(1H-benzimidazol-2-yl)ethyl] disulfane, bis[2-(1H-benzimidazol-2-yl)propyl] disulfane, bis[2-(1H-benzimidazol-2-yl)butyl] disulfane, bis[2-(1H-benzimidazol-2-yl)pentyl] disulfane, bis[3-(1H-imidazol-1-yl)propyl] disulfane, bis[4-(1H-imidazol-1-yl)butyl] disulfane, bis[5-(1H-imidazol-1-yl)pentyl] disulfane, bis[3-(1H-benzimidazol-1-yl)propyl] disulfane, bis[4-(1H-benzimidazol-1-yl)butyl] disulfane, bis[5-(1H-benzimidazol-1-yl)pentyl] disulfane, bis[4-(1H-benzimidazol-1-yl)4-oxobutyl] disulfane, bis[5-(1H-benzimidazol-1-yl)5-oxopentyl] disulfane, N,N'-bis(1H-benzimidazol-2-ylmethyl)-3,3'-disulfanediyldipropanamide, N,N'-bis[2-(1H-benzimidazol-2-yl)ethyl)-3,3'-disulfanediyldipropanamide, N,N'-bis[3-(1H-benzimidazol-2-yl)propyl)-3,3'-disulfanediyldipropanamide, N,N'-bis(1H-benzimidazol-2-ylmethyl)-2,2'-disulfanediyldiethanamide, N,N'-bis(1H-benzimidazol-2-ylmethyl)-4,4'-disulfanediyldibutanamide, 3-(1H-benzimidazol-1-yl)propionohydrazide, 4-(1H-benzimidazol-1-yl)butyrohydrazide, bis[3-(1H-benzimidazol-2-yl)propyl] disulfane, bis[4-(1H-benzimidazol-2-yl)butyl] disulfane, and bis[5-(1H-benzimidazol-2-yl)pentyl] disulfane.

Also preferably, the compound A in the present invention is at least one compound selected from bis[(1H-benzimidazol-1-yl)methyl] disulfane, bis[2-(1H-benzimidazol-1-yl)ethyl] disulfane, bis[2-(1H-benzimidazol-1-yl)propyl] disulfane, bis[2-(1H-benzimidazol-1-yl)butyl] disulfane, bis[2-(1H-benzimidazol-1-yl)pentyl] disulfane, bis[(1H-imidazol-1-yl)methyl] disulfane, bis[2-(1H-imidazol-1-yl)ethyl] disulfane, bis[2-(1H-imidazol-1-yl)propyl] disulfane, bis[2-(1H-imidazol-1-yl)butyl] disulfane, bis[2-(1H-imidazol-1-yl)pentyl] disulfane, bis[2-(1H-benzimidazol-1-yl)-2-oxoethyl] disulfane, 2-(1H-benzimidazol-1-yl)acetohydrazide, bis[(1H-benzimidazol-2-yl)methyl] disulfane, bis[2-(1H-benzimidazol-2-yl)ethyl] disulfane, bis[2-(1H-benzimidazol-2-yl)propyl] disulfane, bis[2-(1H-benzimidazol-2-yl)butyl] disulfane, and bis[2-(1H-benzimidazol-2-yl)pentyl] disulfane.

Here, bis[2-(1H-benzimidazol-1-yl)ethyl] disulfane is a compound a represented by the following formula (IV).

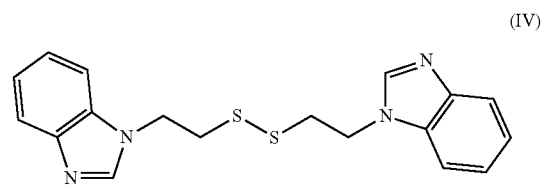 [SMILES: c1ccc2c(c1)ncn2CCSSCCn1cnc2ccccc21]

(IV)

Bis[2-(1H-imidazol-1-yl)ethyl] disulfane is a compound b represented by the following formula (V).

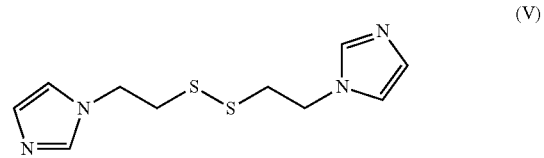 [SMILES: c1cn(CCSSCCn2ccnc2)cn1]

(V)

Bis[3-(1H-imidazol-1-yl)-3-oxopropyl] disulfane is a compound c represented by the following formula (VI).

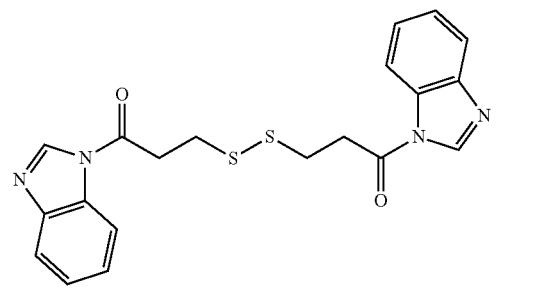

(VI)

2-(1H-benzimidazol-1-yl)acetohydrazide is a compound d represented by the following formula (VII).

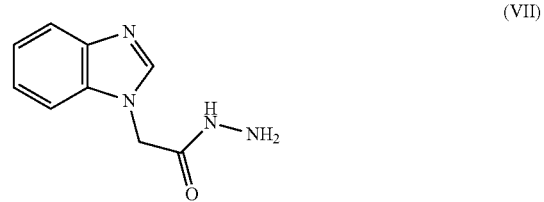 [SMILES: NNC(=O)Cn1cnc2ccccc21]

(VII)

Bis[2-(1H-benzimidazol-2-yl)ethyl] disulfane is a compound e represented by the following formula (VIII).

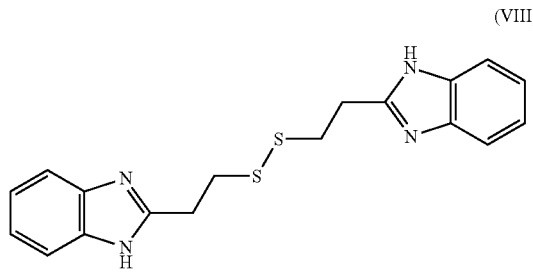

(VIII)

N,N'-bis(1H-benzimidazol-2-ylmethyl)-3,3'-disulfandiyl-dipropanamide is a compound f represented by the following formula (IX).

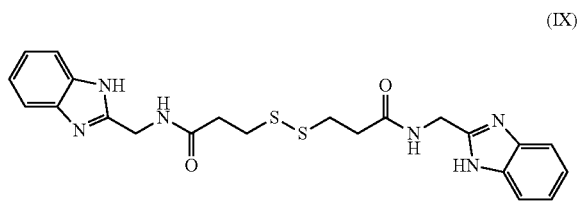 [SMILES: O=C(CCSSCCC(=O)NCc1nc2ccccc2[nH]1)NCc1nc2ccccc2[nH]1]

(IX)

The rubber composition of the present invention is prepared by blending from 0.05 to 30 parts by mass, preferably from 0.1 to 30 parts by mass, more preferably from 0.1 to 20 parts by mass, even more preferably from 0.1 to 10 parts by mass, still more preferably from 0.1 to 5 parts by mass of the compound A, per 100 parts by mass of the rubber component therein.

Filler

The filler to be mixed into the rubber composition of the present invention is preferably carbon black, but may be a combination of carbon black and an inorganic filler.

The rubber composition of the present invention is prepared by mixing from 20 to 150 parts by mass of a filler per 100 parts by mass of the rubber component therein. Preferably, as the filler component therein, the rubber composition is prepared by mixing from 20 to 150 parts by mass of carbon black and from 0 to 130 parts by mass of an inorganic filler, per 100 parts by mass of the rubber component therein. More preferably, the filler component to be incorporated comprises from 20 to 149 parts by mass of carbon black and from 1 to 130 parts by mass of an inorganic filler, even more preferably from 20 to 148 parts by mass of carbon black and from 2 to 130 parts by mass of an inorganic filler, still more preferably from 20 to 145 parts by mass of carbon black and from 5 to 130 parts by mass of an inorganic filler.

Incorporation of carbon black alone increases a tougher reinforcing layer of carbon black and is therefore preferred from the viewpoint of improving the abrasion resistance and the fracture resistance of the composition. Combined incorporation of carbon black and an inorganic filler increases the reinforcing layer of not only carbon black but also the inorganic filler, and is therefore preferred from the viewpoint of improving the balance between the wet performance and the abrasion resistance and the fracture resistance of the composition.

Carbon Black

Carbon black serving as the filler in the rubber composition of the present invention is not specifically defined, but is preferably a high-, middle- or low-structure SAF, ISAF, IISAF, N339, HAF, FEF, GPF or SRF-grade carbon black, especially SAF, ISAF, IISAF, N339, HAF or FEF-grade carbon black. Also preferably, the carbon black has a nitrogen adsorption specific surface area ($N_2SA$, measured according to JIS K 6217-2:2001) of from 30 to 250 $m^2/g$. One alone or two or more different types of such carbon blacks may be used here either singly or as combined.

Inorganic Filler

As the inorganic filler usable in the rubber composition of the present invention, preferred is silica. As the silica, any and every commercially-available one is usable here. Above all, preferred is use of wet method silica, dry-method silica or colloidal silica, and more preferred is use of wet method silica. The BET specific surface area of the silica (as measured according to ISO 5794/1) is preferably from 40 to 350 $m^2/g$. The silica having a BET specific surface area falling within the range is advantageous in that it satisfies both rubber-reinforcing performance and dispersibility in the rubber component. From this viewpoint, more preferred is silica having a BET specific surface falling within a range of from 80 to 350 $m^2/g$, and even more preferred is silica having a BET specific surface falling within a range of from 120 to 350 $m^2/g$. As the silica of the type, usable here are commercial products such as "Nipseal AQ" (BET specific surface area=205 $m^2/g$) and "Nipseal KQ", both trade names of Tosoh Silica Corporation, and "Ultrasil VN3" (BET specific surface area=175 $m^2/g$), a trade name of Degussa GmBH, etc.

Incorporating silica into the rubber composition of the present invention improves the wet performance of tires while maintaining the high elastic modulus and the low heat-generation-property thereof.

As the inorganic filler for use in the rubber composition of the present invention one or more inorganic compounds represented by the following general formula (IX) may be used alone or as combined with silica.

$$dM^1 \cdot xSiO_y \cdot zH_2O \quad (IX)$$

Here in the general formula (IX), $M^1$ represents at least one of a metal selected from a group consisting of aluminium, magnesium, titanium, calcium and zirconium, oxides or hydroxides of these metals, hydrates thereof, and carbonates of these metals; d, x, y and z indicate an integer of from 1 to 5, an integer of from 0 to 10, an integer of from 2 to 5, or an integer of from 0 to 10, respectively.

In case where x and z are both 0 in the general formula (IX), the inorganic compound is at least one metal selected from aluminium, magnesium, titanium, calcium and zirconium, a metal oxide thereof or a metal hydroxide thereof.

As the inorganic compound represented by the above-mentioned general formula (IX), usable here are alumina ($Al_2O_3$) such as γ-alumina, α-alumina, etc.; alumina hydrate ($Al_2O_3 \cdot H_2O$) such as boehmite, diaspore, etc.; aluminium hydroxide [$Al(OH)_3$] such as gibbsite, bialite, etc.; aluminium carbonate [$Al_2(CO_3)_3$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminium magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminium silicate ($Al_2SiO_5$, $Al_4 \cdot 3SiO_4 \cdot 5H_2O$, etc.), magnesium silicate ($Mg_2SiO_4$, $MgSiO_3$, etc.), calcium silicate (Ca$_2$.SiO$_4$, etc.), aluminium calcium silicate (Al$_2$O$_3$.CaO.2SiO$_2$, etc.), magnesium calcium silicate (CaMgSiO$_4$), calcium carbonate (CaCO$_3$), zirconium oxide (ZrO$_2$), zirconium hydroxide [ZrO(OH)$_2$.nH$_2$O], zirconium carbonate [Zr(CO$_3$)$_2$], and crystalline aluminosilicates containing hydrogen, alkali metal or alkaline earth metal for charge correction such as various types of zeolites. Preferred are those of the above-mentioned general formula (IX) where M$^1$ is at least one selected from aluminium metal, aluminium oxide or hydroxide, hydrates thereof, and aluminium carbonate.

The mean particle size of the inorganic compound represented by the above-mentioned general formula (IX) is preferably within a range of from 0.01 to 10 μm, more preferably from 0.05 to 5 μm from the viewpoint of the balance of the kneading workability, the abrasion resistance and the wet grip performance.

In the case where an inorganic filler such as silica or the like is incorporated in the rubber composition of the present invention, preferably a silane coupling agent is incorporated therein from the viewpoint of increasing the reinforcing performance of the inorganic filler, and the incorporation of the agent further enhances the workability in rubber processing and gives tires having better abrasion resistance. Regarding the amount of the silane coupling agent, preferably, the ratio by mass of {silane coupling agent/inorganic filler} is from (1/100) to (20/100). When the ratio is (1/100) or more, then the low-heat-generation property of the rubber composition may be favorably more remarkable; and when the ratio is (20/100) or less, then the cost of the rubber composition may be reduced and the economic efficiency thereof may be increased. More preferably, the ratio by mass is from (3/100) to (20/100), even more preferably from (4/100) to (10/100).

The silane coupling agent for use in the rubber composition is not specifically defined but is preferably one or more compounds selected from the compounds shown below.

Specific examples of the silane coupling agent include alkoxyalkyl polysulfides such as bis(3-triethoxysilylpropyl) tetrasulfide, bis(3-trimethoxysilylpropyl) tetrasulfide, bis(3-methyldimethoxysilylpropyl) tetrasulfide, bis(2-triethoxysilylethyl) tetrasulfide, bis(3-triethoxysilylpropyl) disulfide, bis(3-trimethoxysilylpropyl) disulfide, bis(3-methyldimethoxysilylpropyl) disulfide, bis(2-triethoxysilylethyl) disulfide, bis(3-triethoxysilylpropyl) trisulfide, bis(3-trimethoxysilylpropyl) trisulfide, bis(3-methyldimethoxysilylpropyl) trisulfide, bis(2-triethoxysilylethyl) trisulfide, bis(3-monoethoxydimethylsilylpropyl) tetrasulfide, bis(3-monoethoxydimethylsilylpropyl) trisulfide, bis(3-monoethoxydimethylsilylpropyl) disulfide, bis(3-monomethoxydimethylsilylpropyl) tetrasulfide, bis(3-monomethoxydimethylsilylpropyl) trisulfide, bis(3-monomethoxydimethylsilylpropyl) disulfide, bis(2-monoethoxydimethylsilylethyl) tetrasulfide, bis(2-monoethoxydimethylsilylethyl) trisulfide, bis(2-monoethoxydimethylsilylethyl) disulfide, etc.; alkanoylthioalkyltrialkoxysilanes such as 3-hexanoylthiopropyltriethoxysilane, 3-octanoylthiopropyltriethoxysilane {manufactured by Momentive Performance Materials, trade name "NXT Silane" (registered trademark)}, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, etc.; Momentive Performance Materials' trade name "NXT Low-V Silane" (registered trademark); Momentive Performance Materials' trade name "NXT Ultra Low-V Silane" (registered trademark); Momentive Performance Materials' trade name "NXT Z" (registered trademark), etc.

The rubber component for use in the rubber composition of the present invention must contain a diene-based rubber in an amount of 50% by mass or more, and the diene-based rubber therein is preferably 100% by mass. Preferably, the diene-based rubber is at least one selected from a natural rubber and a synthetic diene-based rubber.

With no limitation thereon, the synthetic diene-based rubber may be any rubber containing a dienic monomer as at least a part of the monomer that constitutes the rubber. Concretely, usable here are a styrene-butadiene copolymer rubber (SBR), a polybutadiene rubber (BR), a polyisoprene rubber (IR), an acrylonitrile-butadiene copolymer rubber (NBR), a butyl rubber (IIR), a halogenobutyl rubber (chlorobutyl rubber (Cl-IIR), bromobutyl rubber (Br-IIR), etc.}, an ethylene-propylene-diene tercopolymer rubber (EPDM), an ethylene-butadiene copolymer rubber (EBR), a propylene-butadiene copolymer rubber (PBR), etc. One alone or two or more of such natural rubber and synthetic diene-based rubber may be used here either singly or as combined.

The other rubber component than the diene-based rubber includes an ethylene-propylene copolymer rubber (EPM), an acryl rubber (ACM), a chloropolyethylene (CM), an epichlorohydrin rubber (CO, ECO), a chlorosulfonated polyethylene (CSM), etc.

In the rubber composition of the present invention, various compounding ingredients which are generally compounded in a rubber composition, for example, stearic acid, resin acid, a vulcanization activator such as zinc oxide or the like, as well as an antiaging agent, a softener and the like may be incorporated, if desired, in the first stage or final stage of kneading, or in the intermediate stage between the first stage and the final stage. In addition, in the final stage of kneading, a vulcanization agent such as sulfur or the like, or a vulcanization accelerator or the like may be incorporated.

As the kneading apparatus to be employed in producing the rubber composition of the present invention, there are mentioned a Banbury mixer, a roll, an intensive mixer, a kneader, a biaxial extruder, etc.

EXAMPLES

The present invention is described in more detail with reference to Examples given below, but the present invention is not restricted at all to the following Examples.

Dynamic elastic modulus E' index and tan δ index were evaluated according to the method mentioned below.

Dynamic Elastic Modulus E' Index and Tan δ Index

Using a spectrometer manufactured by Ueshima Seisakusho Co., Ltd., each sample was analyzed at a frequency of 52 Hz, at an initial strain of 10%, at a temperature of 60° C. and at a dynamic strain of 1%. The found data of dynamic elastic modulus E' and tan δ of the sample were expressed as index indication according to the following formula, per the numerical value of dynamic elastic modulus E' and tan δ of Comparative Example 1 or 3, each as referred to as 100.

Regarding the dynamic elastic modulus E', the samples having a larger index value have a higher dynamic elastic modulus E'. On the other hand, regarding the tan δ index, the samples having a smaller index value have a better low-heat-generation property and have a smaller hysteresis loss.

Dynamic Elastic Modulus E' Index={(dynamic elastic modulus E' of vulcanized rubber composition tested)/(dynamic elastic modulus E' of vulcanized rubber composition in Comparative Example 1 or 3)}×100

Tan δ Index={(tan δ of vulcanized rubber composition tested)/(tan δ of vulcanized rubber composition in Comparative Example 1 or 3)}×100

Production Example 1

50 mL of DMF (N,N-dimethylformamide) and 14.2 g of benzimidazole were added to 6.20 g of bis(2-methanesulfonyloxyethyl) disulfide, and stirred at 65 to 70° C. for 18 hours. This was processed for liquid-liquid separation using 200 mL of ethyl acetate and 300 mL of water. The organic layer was distilled under reduced pressure. This was purified through a silica gel column chromatography (chloroform/methanol) to give 2.10 g of bis[2-(1H-benzimidazol-1-yl)ethyl] disulfane, the compound a represented by the above-mentioned formula (IV).
$^1$H-NMR (500 MHz, CDCl$_3$, δ ppm): 3.2 (t, 4H), 4.5 (t, 4H), 7.2 (m, 4H), 7.6 (d, 2H), 7.6 (d, 2H), 8.2 (s, 2H)

Production Example 2

Bis[2-(1H-imidazol-1-yl)ethyl] disulfane, the compound b represented by the above-mentioned formula (V) was obtained in the same manner as in Production Example 1 except that benzimidazole in Production Example 1 was substituted with the same molar amount of imidazole. This compound is CAS Registry Number: 227937-29-3.

Production Example 3

14.4 g of benzimidazole and 100 ml of dewatered tetrahydrofuran were cooled with ice, then 6.72 g of 3,3'-dithiobis(propionyl chloride) (88.9% wt.) was gradually and dropwise added thereto, and thereafter this was restored to room temperature and stirred for 4 hours. The crystal was collected through filtration, then crushed and washed with 200 ml of methanol, the resultant crystal was taken out through filtration and dried under reduced pressure at 40° C. to give 5.5 g of bis[3-(1H-benzimidazol-1-yl)-3-oxopropyl] disulfane, the compound c represented by the above-mentioned formula (VI).
Property: white solid
Melting Point: 168° C.
$^1$H-NMR (500 MHz, DMSO-D$_6$, δ ppm): 3.2 (t, 4H), 3.6 (t, 4H), 7.4 (m, 4H), 7.8 (m, 2H), 8.2 (m, 2H), 9.0 (s, 2H)

Production Example 4

6.1 g of sodium hydride and 200 ml of dewatered dimethylformamide were cooled with ice, and 15 g of benzimidazole was, as divided in portions, put thereinto. This was stirred at room temperature for 1 hour, then 23.3 g of methyl bromoacetate was dropwise added thereto with cooling with ice, and stirred at room temperature for 17 hours. This was neutralized with an aqueous ammonium chloride solution, was then processed for liquid-liquid separation using ethyl acetate, and the solvent was evaporated away under reduced pressure. Next, 200 ml of methanol and 25 g of 100% hydrazine hydrate were added thereto, and stirred at 50° C. for 18 hours. The solvent was evaporated away under reduced pressure, then the residue was recrystallized with 2-propanol, and the crystal was collected through filtration and dried overnight using a vacuum pump to give 6.4 g of 2-(1H-benzimidazol-1-yl)acetohydrazide, the compound d represented by the above-mentioned formula (VII).
Property: white solid
Melting Point: 252° C.
$^1$H-NMR (500 MHz, DMSO-D$_6$, δ ppm): 4.3 (brs, 2H), 7.2 (m, 2H), 7.5 (d, 1H), 7.7 (d, 1H), 8.2 (s, 1H), 9.5 (brs, 1H)

Production Example 5

3.09 g of 1,2-phenylenediamine and 3.0 g of 3,3'-dithiopropionic acid were heated under reflux in 31 ml of 4 N hydrochloric acid for 21 hours, and the pH thereof was made to be 8 to 9 with cooling along with 4 N sodium hydroxide, and the thus-precipitated crystal was collected through filtration. The resultant crystal was suspended in ethyl acetate and saturated sodium bicarbonate water (1/1), washed and filtered to remove the by-product, monocarboxylic acid, and then this was dried under reduced pressure to give 3.3 g of bis[2-(1H-benzimidazol-2-yl)ethyl] disulfane, the compound e represented by the above-mentioned formula (VIII).
Property: gray solid
$^1$H-NMR (500 MHz, DMSO-D$_6$, δ ppm): 3.19-3.25 (m, 8H), 7.12 (s, 4H), 7.41-7.53 (m, 4H), 12.3 (s, 2H)

Production Example 6

13.4 g of 2-aminomethylbenzimidazole and 300 ml of dewatered tetrahydrofuran were cooled with ice, and then 5.0 g of 3,3'-dithiobis(propionyl chloride) was gradually and dropwise added thereto. This was stirred at room temperature for 2 hours. The crystal was collected through filtration, then crushed and washed with 200 ml of water, and the crystal was again collected through filtration, and dried under reduced pressure at 40° C. to give 7.9 g of N,N'-bis (1H-benzimidazol-2-ylmethyl)-3,3'-disulfanediyldipropanamide, the compound f represented by the above-mentioned formula (IX).
Property: white solid
Melting Point: 208° C.
$^1$H-NMR (300 MHz, DMSO-D$_6$, δ ppm): 2.6 (t, 4H), 3.0 (t, 4H), 4.5 (d, 4H), 7.1 (m, 4H), 7.4 (m, 2H), 7.5 (m, 2H), 8.7 (t, 2H), 12.2 (brs, 2H)

Examples 1 to 24 and Comparative Examples 1 to 4

According to the compound formulation shown in Table 1 and Table 2, the components were kneaded in a Banbury mixer while the highest temperature of the rubber composition in the first stage of kneading could be 160° C. in every case, and in the final stage of kneading, an antiaging agent TMQ, zinc flower, a vulcanization accelerator TBBS and sulfur were added and further kneaded to prepare 28 types of rubber compositions. Subsequently, each rubber composition was vulcanized at a temperature of 145° C. The vulcanization time was, as defined to be $t_c(90)$ value (min)× 1.5 times, {$t_c(90)$ value defined in JIS K 6300-2:2001}. Thus obtained, 28 types of the vulcanized rubber compositions were analyzed according to the method mentioned above to determine the dynamic elastic modulus E' index and the tan δ index thereof. The results are shown in Table 1 and Table 2.

TABLE 1

| | | Example | | | | | | | | | | | | Comparative Example | |
|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 |
| Compounding Formulation (part by mass) | Natural Rubber *1 | 100.0 | 100.0 | 100.0 | 100.0 | 100.0 | 100.0 | 100.0 | 100.0 | 100.0 | 100.0 | 100.0 | 100.0 | 100.0 | 100.0 |
| | Carbon Black N220 *2 | 50.0 | 50.0 | 50.0 | 50.0 | 50.0 | 50.0 | 50.0 | 50.0 | 50.0 | 50.0 | 50.0 | 50.0 | 50.0 | 50.0 |
| | Compound a *3 | 0.5 | 1.0 | — | — | — | — | — | — | — | — | — | — | — | — |
| | Compound b *4 | — | — | 0.5 | 1.0 | — | — | — | — | — | — | — | — | — | — |
| | Compound c *5 | — | — | — | — | 0.5 | 1.0 | — | — | — | — | — | — | — | — |
| | Compound d *6 | — | — | — | — | — | — | 0.5 | 1.0 | — | — | — | — | — | — |
| | Compound e *7 | — | — | — | — | — | — | — | — | 0.5 | 1.0 | — | — | — | — |
| | Compound f *8 | — | — | — | — | — | — | — | — | — | — | 0.5 | 1.0 | — | — |
| | Compound g *9 | — | — | — | — | — | — | — | — | — | — | — | — | 0.5 | 1.0 |
| | Aromatic Oil *10 | 5.0 | 5.0 | 5.0 | 5.0 | 5.0 | 5.0 | 5.0 | 5.0 | 5.0 | 5.0 | 5.0 | 5.0 | 5.0 | 5.0 |
| | Stearic Acid | 2.0 | 2.0 | 2.0 | 2.0 | 2.0 | 2.0 | 2.0 | 2.0 | 2.0 | 2.0 | 2.0 | 2.0 | 2.0 | 2.0 |
| | Antiaging Agent 6PPD *11 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Antiaging Agent TMQ *12 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Zinc Oxide | 2.5 | 2.5 | 2.5 | 2.5 | 2.5 | 2.5 | 2.5 | 2.5 | 2.5 | 2.5 | 2.5 | 2.5 | 2.5 | 2.5 |
| | Vulcanization Accelerator TBBS *13 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Properties of Vulcanized Rubber Composition | Dynamic Elastic Modulus E' Index | 122 | 130 | 120 | 129 | 112 | 121 | 109 | 115 | 105 | 108 | 107 | 110 | 100 | 105 |
| | Tanδ Index | 97 | 93 | 96 | 93 | 96 | 92 | 93 | 91 | 94 | 92 | 92 | 90 | 100 | 97 |

TABLE 2

| | | Example | | | | | | | | | | | | Comparative Example | |
|---|---|---|---|---|---|---|---|---|---|---|---|---|---|---|---|
| | | 13 | 14 | 15 | 16 | 17 | 18 | 19 | 20 | 21 | 22 | 23 | 24 | 3 | 4 |
| Compounding Formulation (part by mass) | Natural Rubber *1 | 80.0 | 80.0 | 80.0 | 80.0 | 80.0 | 80.0 | 80.0 | 80.0 | 80.0 | 80.0 | 80.0 | 80.0 | 80.0 | 80.0 |
| | Polybutadiene Rubber *14 | 20.0 | 20.0 | 20.0 | 20.0 | 20.0 | 20.0 | 20.0 | 20.0 | 20.0 | 20.0 | 20.0 | 20.0 | 20.0 | 20.0 |
| | Carbon Black N220 *2 | 45.0 | 45.0 | 45.0 | 45.0 | 45.0 | 45.0 | 45.0 | 45.0 | 45.0 | 45.0 | 45.0 | 45.0 | 45.0 | 45.0 |
| | Silica *15 | 10.0 | 10.0 | 10.0 | 10.0 | 10.0 | 10.0 | 10.0 | 10.0 | 10.0 | 10.0 | 10.0 | 10.0 | 10.0 | 10.0 |
| | Silane Coupling Agent *16 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Compound a *3 | 0.5 | 1.0 | — | — | — | — | — | — | — | — | — | — | — | — |
| | Compound b *4 | — | — | 0.5 | 1.0 | — | — | — | — | — | — | — | — | — | — |
| | Compound c *5 | — | — | — | — | 0.5 | 1.0 | — | — | — | — | — | — | — | — |
| | Compound d *6 | — | — | — | — | — | — | 0.5 | 1.0 | — | — | — | — | — | — |
| | Compound e *7 | — | — | — | — | — | — | — | — | 0.5 | 1.0 | — | — | — | — |
| | Compound f *8 | — | — | — | — | — | — | — | — | — | — | 0.5 | 1.0 | — | — |
| | Compound g *9 | — | — | — | — | — | — | — | — | — | — | — | — | 0.5 | 1.0 |
| | Aromatic Oil *10 | 6.0 | 6.0 | 6.0 | 6.0 | 6.0 | 6.0 | 6.0 | 6.0 | 6.0 | 6.0 | 6.0 | 6.0 | 6.0 | 6.0 |
| | Stearic Acid | 2.0 | 2.0 | 2.0 | 2.0 | 2.0 | 2.0 | 2.0 | 2.0 | 2.0 | 2.0 | 2.0 | 2.0 | 2.0 | 2.0 |
| | Antiaging Agent 6PPD *11 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Antiaging Agent TMQ *12 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Zinc Oxide | 2.5 | 2.5 | 2.5 | 2.5 | 2.5 | 2.5 | 2.5 | 2.5 | 2.5 | 2.5 | 2.5 | 2.5 | 2.5 | 2.5 |
| | Vulcanization Accelerator TBBS *13 | 1.2 | 1.2 | 1.2 | 1.2 | 1.2 | 1.2 | 1.2 | 1.2 | 1.2 | 1.2 | 1.2 | 1.2 | 1.2 | 1.2 |
| | Sulfur | 2.5 | 2.5 | 2.5 | 2.5 | 2.5 | 2.5 | 2.5 | 2.5 | 2.5 | 2.5 | 2.5 | 2.5 | 2.5 | 2.5 |
| Properties of Vulcanized Rubber Composition | Dynamic Elastic Modulus E' Index | 122 | 128 | 120 | 128 | 109 | 118 | 108 | 113 | 104 | 107 | 107 | 115 | 100 | 102 |
| | Tanδ Index | 96 | 93 | 96 | 93 | 97 | 93 | 94 | 92 | 94 | 93 | 93 | 92 | 100 | 98 |

Notes

*1: RSS-1.

*2: manufactured by Asahi Carbon Co., Ltd., trade name "#80".

*3: Compound a: bis[2-(1H-benzimidazol-1-yl)ethyl] disulfane obtained in Production Example 1 and represented by the formula (IV).

*4: Compound b: bis[2-(1H-imidazol-1-yl)ethyl] disulfane obtained in Production Example 2 and represented by the formula (V): CAS Registry Number: 227937-29-3.

*5: Compound c: bis[3-(1H-benzimidazol-1-yl)-3-oxopropyl] disulfane obtained in Production Example 3 and represented by the formula (VI).

*6: Compound d: 2-(1H-benzimidazol-1-yl)acetohydrazide obtained in Production Example 4 and represented by the formula (VII).

*7: Compound e: bis[2-(1H-benzimidazol-2-yl)ethyl] disulfane obtained in Production Example 5 and represented by the formula (VIII).

*8: Compound f: N,N'-bis(1H-benzimidazol-2-ylmethyl)-3,3'-disulfanediyldipropanamide obtained in Production Example 6 and represented by the formula (IX).

*9: Compound g: 3-hydroxy-N'-(1,3-dimethylbutylidene)-2-naphthoic acid hydrazide (see PTL 1, Synthesis Example 2).

*10: manufactured by Fuji Kosan Co., Ltd., "Aromax #3".

*11: N-(1,3-dimethylbutyl)-N'-phenyl-p-phenylenediamine, manufactured by Ouchi Shinko Chemical Industrial Co., Ltd., trade name "Noclac 6C".
*12: 2,2,4-Trimethyl-1,2-dihydroquinoline polymer, manufactured by Ouchi Shinko Chemical Industry Co., Ltd., trade name "Noclac 224".
*13: N-tert-butyl-2-benzothiazolylsulfenamide, manufactured by Sanshin Chemical Industry Co., Ltd., trade name "Sanceler NS".
*14: manufactured by JSR Corporation, trade name "JSR BR01".
*15: manufactured by Tosoh Silica Corporation, trade name "Nipseal AQ" (BET specific surface area 205 m²/g).
*16: Bis(3-triethoxysilylpropyl) disulfide (mean sulfur chain length: 2.35), Evonik's silane coupling agent, trade name "Si75" (registered trademark).

As obvious from Table 1 and Table 2, the rubber compositions of Examples 1 to 12, as compared with the rubber composition of Comparative Example 1 or 2 corresponding thereto, and the rubber compositions of Examples 13 to 24, as compared with the rubber compositions of Comparative Example 3 or 4 corresponding thereto, all have a higher dynamic elastic modulus E' index and a lower tan δ index.

INDUSTRIAL APPLICABILITY

The rubber composition of the present invention has an excellent low-heat-generation property, and is therefore favorably used for constitutive members of various types of tires for passenger cars, small-size trucks, minivans, pickup trucks and big-size vehicles (trucks, buses, mining carts, construction vehicles, etc.) and others, especially for tread members (tread grounded members, base tread members) of pneumatic radial tires for big-size vehicles.

The invention claimed is:

1. A rubber composition prepared by mixing, per 100 parts by mass of a rubber component comprising at least 50% by mass of a diene-based rubber, from 20 to 150 parts by mass of a filler, and from 0.05 to 30 parts by mass of a compound A which has an amidine structure represented by the following formula (I) and has a functional group reactive with the diene-based rubber, wherein the functional group reactive with the diene-based rubber is at least one selected from a polysulfide group, a thiol group, a hydrazide group and a hydrazone group

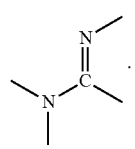

(I)

2. The rubber composition according to claim 1, wherein the filler comprises, per 100 parts by mass of the rubber component, from 20 to 150 parts by mass of carbon black and from 0 to 130 parts by mass of an inorganic filler.

3. The rubber composition according to claim 1, wherein the amidine structure is a structure to form a hetero ring represented by the following formula (II-1) or (II-2):

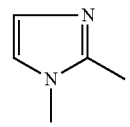

(II-1)

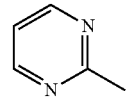

(II-2)

4. The rubber composition according to claim 1, wherein the amidine structure is a structure not having a nitrogen-hydrogen bond (N—H).

5. The rubber composition according to claim 1, wherein the amidine structure is a structure having an amide structure represented by the following formula (III):

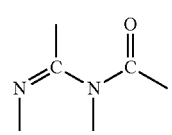

(III)

6. The rubber composition according to claim 1, wherein the compound A is at least one selected from bis[(1H-benzimidazol-1-yl)methyl] disulfane, bis[2-(1H-benzimidazol-1-yl)ethyl] disulfane, bis[2-(1H-benzimidazol-1-yl)propyl] disulfane, bis[2-(1H-benzimidazol-1-yl)butyl] disulfane, bis[2-(1H-benzimidazol-1-yl)pentyl] disulfane, bis[(1H-imidazol-1-yl)methyl] disulfane, bis[2-(1H-imidazol-1-yl)ethyl] disulfane, bis[2-(1H-imidazol-1-yl)propyl] disulfane, bis[2-(1H-imidazol-1-yl)butyl] disulfane, bis[2-(1H-imidazol-1-yl)pentyl] disulfane, bis[2-(1H-benzimidazol-1-yl)-2-oxoethyl] disulfane, bis [3-(1H-benzimidazol-1-yl)-3-oxopropyl] disulfane, bis [3-(1H-benzimidazol-1-yl)-3-oxobutyl] disulfane, bis [3-(1H-benzimidazol-1-yl)-3-oxopentyl] disulfane, 2-(1H-benzimidazol-1-yl) acetohydrazide, bis [(1H-benzimidazol-2-yl)methyl] disulfane, bis[2-(1H-benzimidazol-2-yl)ethyl] disulfane, bis [2-(1H-benzimidazol-2-yl)propyl] disulfane, bis[2-(1H-benzimidazol-2-yl)butyl] disulfane, and bis[2-(1H-benzimidazol-2-yl)pentyl] disulfane.

7. A pneumatic tire using the rubber composition of claim 1.

* * * * *